United States Patent
Akoh

(10) Patent No.: US 6,629,357 B1
(45) Date of Patent: *Oct. 7, 2003

(54) METHOD OF MAGNETIC HEAD MANUFACTURE

(75) Inventor: Shin-ichi Akoh, Osaka-fu (JP)

(73) Assignee: Read-Rite SMI Corp., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 297 days.

(21) Appl. No.: 09/247,889

(22) Filed: Feb. 10, 1999

(51) Int. Cl.$^7$ .......................... G11B 5/127; H04R 31/00
(52) U.S. Cl. ................. 29/603.18; 29/603.12; 360/121; 360/321
(58) Field of Search ................ 29/603.12, 603.15, 29/603.18; 360/103, 104, 121, 321

(56) References Cited

U.S. PATENT DOCUMENTS

| | | | | |
|---|---|---|---|---|
| 4,129,937 A | * | 12/1978 | Knutson et al. | 29/603.12 |
| 4,333,229 A | * | 6/1982 | Ellenberger | 29/603.12 |
| 4,896,417 A | * | 1/1990 | Sawada et al. | 29/603.15 X |

* cited by examiner

Primary Examiner—Peter Vo
Assistant Examiner—Minh Trinh
(74) Attorney, Agent, or Firm—Burgess & Bereznak, LLP

(57) ABSTRACT

A magnetic head manufacturing method. In one embodiment, a wafer including magnetic head devices formed on the surface thereof are cut out into individual sliders. Photoresist is applied on the air bearing surfaces of the sliders and is then baked. The surface tension causes the photoresist at the peripheral regions of the air bearing surface to taper and become rounded or thinned. The air bearing surface is then uniformly dry-etched such that the peripheral regions of the air bearing surface are rounded in a tapered shape.

3 Claims, 2 Drawing Sheets

[Figure 1]
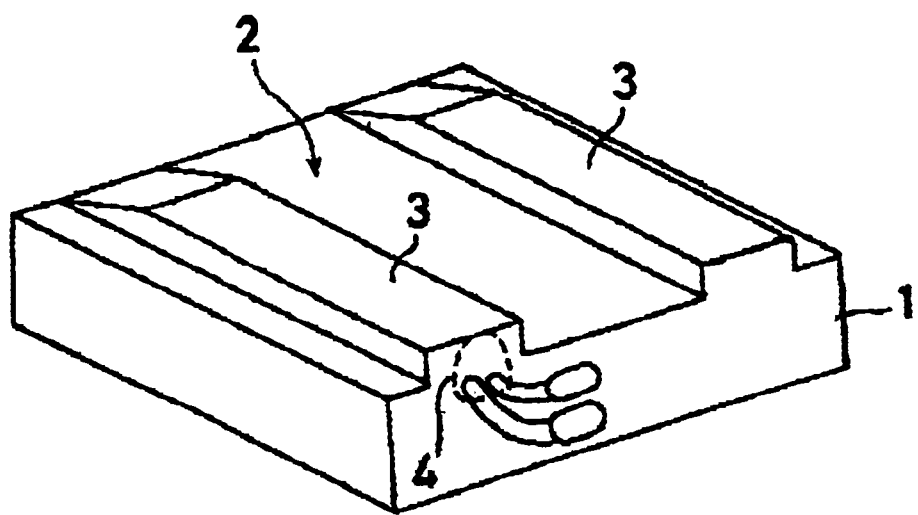

[Figure 2]
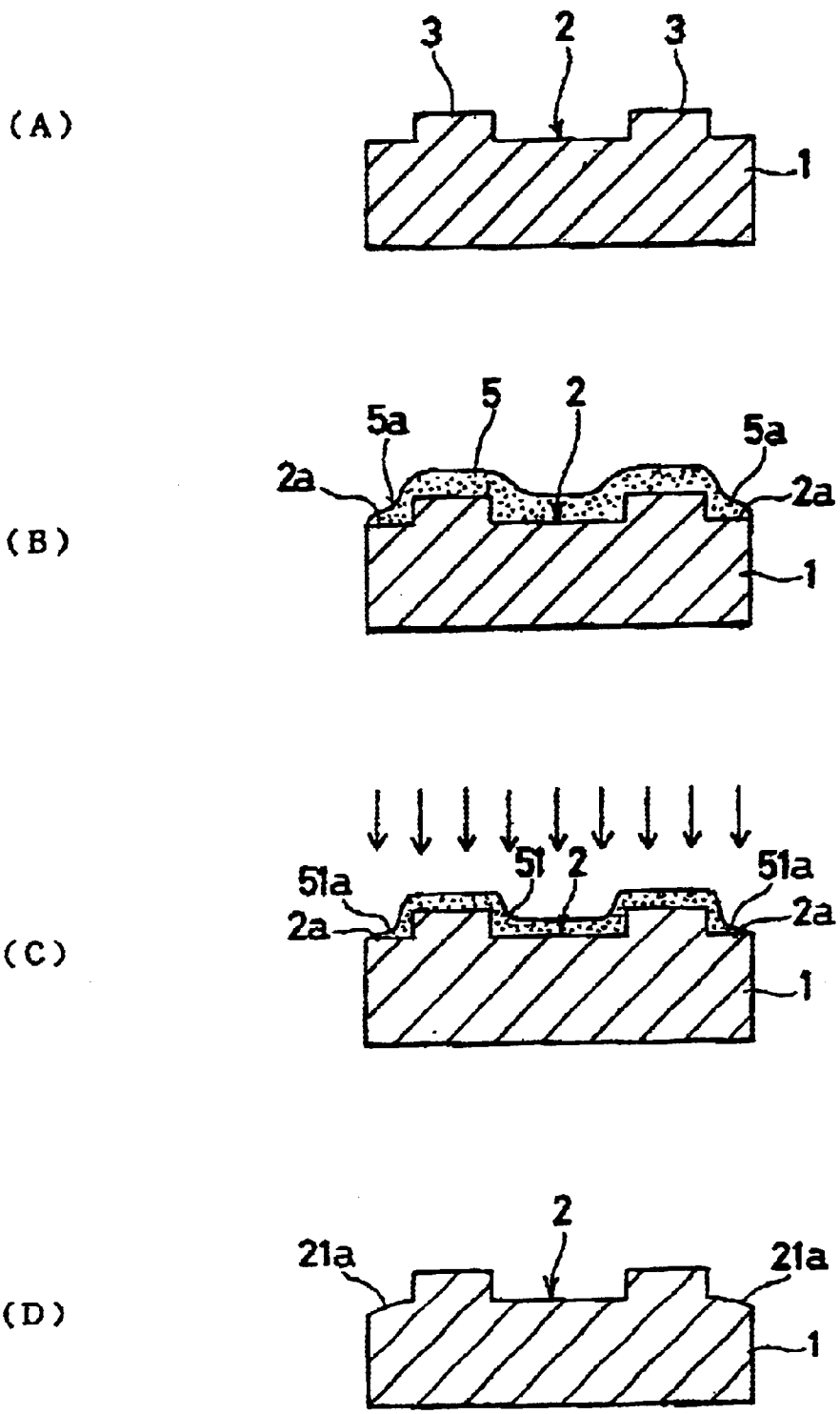

_US 6,629,357 B1_

METHOD OF MAGNETIC HEAD MANUFACTURE

BACKGROUND OF THE INVENTION

1. Field of the Invention

The present invention concerns a method for manufacturing magnetic heads used in the recording and reproduction equipment of various electronic devices, such as hard disk systems, computers, and word processors. In particular, it concerns a method for manufacturing magnetic heads which are magnetic heads to perform data recording and reproduction while traveling and flying at an infinitesimal gap over the flat surface of the recording medium, and which are in various types including inductive types, magneto-resistive (MR) types, and inductive/MR hybrid types.

2. Background Information

Ordinarily, this type of magnetic head is formed by first forming numerous magnetic head elements on a wafer; cutting these out into strip-shaped sliders; forming flying rails and so on in patterns of specified shapes on the air bearing surface (ABS); and then cutting out and separating these into individual magnetic head sliders. In addition to ordinary mechanical cutting and machining, the ABS pattern formation has recently been performed by etching using photolithography techniques in order to raise machining precision and improve flying characteristics.

However, in the case of magnetic heads of the prior art described above, in both the ABS machining and the etching, burrs occur readily in the peripheral part of the slider, and consequently stable flying characteristics cannot be obtained, and crashes occur to damage the recording medium surface.

There has also been a problem in which, in so-called contact-start-stop (CSS) method magnetic disk devices, when the magnetic head lands on the recording medium surface at the time the motor is stopped, sharp angled parts of the slider peripheral part cause scratches on the recording medium surface, or the head itself may be damaged during intervals in which CSS operation is repeated. Further, the slider ABS is formed to be highly planar, and so tends to adhere easily to the recording medium V surface, so that in CSS operation take-off becomes impossible, shocks and wear occur, and the magnetic head durability and lifetime are degraded.

Consequently, in the prior art a method is adopted in which the peripheral part of the slider is chamfered by lapping the ABS or otherwise using machining. However, such machining has a relatively large tolerance, and as sliders have been made smaller and slider flying heights have been reduced to accompany recent rises in recording densities and reductions in device sizes, the influence on flying characteristics has increased, and flying heights have become unstable, inviting reductions in magnetic head reliability.

The present invention was devised in consideration of these problems of the prior art described above.

SUMMARY OF THE INVENTION

A method of manufacturing a magnetic head is disclosed. In one embodiment, the method includes the steps of cutting out an individual slider from a wafer. A magnetic head device is formed on a surface of the wafer. The method also includes applying photoresist on an air bearing surface of the slider, baking the photoresist and then uniformly dry etching the air bearing surface.

BRIEF DESCRIPTION OF THE DRAWINGS

FIG. 1 is a perspective view showing a two-rail taper-flat type magnetic head of the prior art.

FIGS. 2A–D are cross-sectional diagrams of magnetic heads showing the order of procedures for ABS finishing processing of the present invention.

| Explanation of Symbols | |
|---|---|
| 1 | Magnetic head |
| 2 | ABS |
| 2a | Peripheral part |
| 3 | Rail |
| 4 | Magnetic head element |
| 5, 51 | Photoresist |
| 5a, 51a | Peripheral part |

DETAILED DESCRIPTION

The present invention is intended to achieve the purpose described above; it is explained below using the real example shown in the drawings. The purpose of the present invention is to provide a method in which, by adding roundness to the angled parts of the peripheral parts of the magnetic head slider, highly durable and reliable magnetic heads may be manufactured which prevent adhesion to the recording medium surface, improve resistance to disk shocks, and enable stable flying characteristics even for smaller magnetic heads and lower flying heights.

The method of magnetic head manufacturing of the present invention consists of a procedure of cutting out into individual sliders a wafer. Numerous magnetic head devices are formed on the surface of the wafer. The present invention includes a process in which after the application of photoresist on the air bearing surface of each slider and baking, the aforementioned air bearing surfaces are uniformly dry-etched.

Hence by means of the present invention, photoresist applied to the ABS causes rounding at the slider peripheral part due to its surface tension, and when this is baked, the film thickness of the photoresist at said peripheral part becomes rounded and thin facing the outside edges; therefore this curved shape is transferred to the ABS by uniform dry etching, and the peripheral part can be trimmed to be rounded in a tapered shape.

In addition, this processing is such that the shape and the amount removed can be controlled with relatively high precision by appropriately selecting the viscosity, amount, and so on of the photoresist used in dry etching, regardless of the size of the slider. Therefore when the magnetic head is an inductive/MR hybrid head, there is the advantage that it can readily be made to accommodate recent trends toward high recording densities and small devices.

Further, because it is desirable that dry etching be performed such that only the peripheral part of the ABS of the slider be removed, by which means the effect of the ABS etching on the entire slider is held to a minimum, the method of magnetic head manufacture of the present invention is capable of maintaining stable flying characteristics without causing fluctuations in the flying behavior of the magnetic head.

FIG. 1 shows a taper-flat type magnetic head 1 of the prior art, manufactured by a method of the prior art. Its ABS 2 is formed from two parallel rails 3, with the magnetic head element 4 positioned at the air-outflow edge. In the method of the present invention, first the magnetic head 1 is placed horizontally with the ABS 2 facing upward, as shown in FIG. 2A.

FIG. 2B shows that ABS 2 is coated by spin-coating with a thermosetting photoresist 5, such as for example novolac resin. The photoresist 5 is approximately uniform over most areas, excluding the peripheral part of the ABS 2, as illustrated in FIG. 2B. Because of its surface tension, photoresist 5 at the peripheral part 2a is rounded and becomes gradually thinner.

Next the aforementioned photoresist is baked. The photoresist 51 contracts overall, as shown in FIG. 2C, and the film thickness becomes thinner approximately uniformly over most areas, except for the peripheral part. At the peripheral part 51a, photoresist 51 becomes round and thinner toward the outer edge. In this state, an ion beam is made incident uniformly to mill the material, thereby uniformly dry-etching the entire ABS 2. In the present invention, in addition to the ion milling of the present real example, RIE (reactive ion etching) and other well-known dry etching techniques can also be used.

This etching is controlled such that only the peripheral part 2a of the ABS 2 is removed. That is, photoresist 51 remains at all parts other than peripheral part 2A. Finally, the photoresist remaining on the ABS 2 is removed using an appropriate solvent or by other means, and the shape of the photoresist of the peripheral part 51a is transferred, to obtain the magnetic head of FIG. 2D with the ABS peripheral part 2a removed in a round, tapered shape.

The amount of etching and the shape of the ABS peripheral part 2a after etching can be adjusted by appropriately selecting the type of photoresist used, its viscosity and other properties, the film thickness, and so on. For example, in the case of a pico-size slider, if the etching amount is held between 10 and 50 µm or so, there is no practical effect on the slider flying characteristics.

A suitable real example of the present invention has been explained above. However, in the present invention various modifications and alterations can be added in implementing the above-described real example, within engineering limits. For example, numerous magnetic heads cut out individually can be arranged on the same table, and to these photoresist can be applied and etching performed simultaneously. Further, the present invention can similarly be applied to various types of magnetic heads other than two-rail taper-flat type magnetic heads.

Thus, by means of the method of magnetic head manufacture of the present invention, dry etching is used to shape the peripheral part of the slider, which has been subjected to photoresist application and baking, to a rounded taper shape, without the addition of complicated mask processing or numerous procedures. With the present invention, uniform trimming of the ABS peripheral part of each slider is possible, without dispersion among numerous sliders and regardless of the slider size. In the case of smaller sliders such as pico-size sliders, the effect on the magnetic head flying characteristics can be effectively eliminated, so that performance and manufacturing yields can be improved in response to demands for higher recording densities and smaller devices, and costs can be reduced as well.

What is claimed is:

1. A method of manufacturing a magnetic head, the method comprising:

cutting out an individual slider from a wafer, wherein a magnetic head device is formed on a surface of the wafer;

applying photoresist on an air bearing surface of the slider such that the photoresist is rounded and slopes downward in a curved shape toward a peripheral region of the air bearing surface;

baking the photoresist; and uniformly dry etching the air bearing surface.

2. The method of manufacturing the magnetic head described in claim 1, wherein uniformly dry etching the air bearing surface includes the step of removing only the peripheral region of the air bearing surface.

3. The method of manufacturing the magnetic head described in claim 1 wherein the magnetic head is an inductive/MR hybrid head.

* * * * *